(12) United States Patent
Walser et al.

(10) Patent No.: US 7,434,322 B2
(45) Date of Patent: Oct. 14, 2008

(54) REFERENCE BEAM GENERATOR AND SYSTEM FOR PRODUCING GUIDE BEAMS FOR FIELD MARKERS

(75) Inventors: Bernd Walser, Heerburg (CH); Bernhard Braunecker, Rebstein (CH); Peter Kipfer, Marbach (CH); Christian Betschon, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 6 days.

(21) Appl. No.: 11/277,221

(22) Filed: Mar. 22, 2006

(65) Prior Publication Data

US 2007/0062053 A1    Mar. 22, 2007

(30) Foreign Application Priority Data

Sep. 6, 2005    (EP)    ................... 05108174

(51) Int. Cl.
G01B 11/26    (2006.01)
G01C 15/12    (2006.01)

(52) U.S. Cl. .................. 33/286; 33/289; 33/DIG. 21

(58) Field of Classification Search ............. 33/1 CC, 33/1 DD, 1 G, 227, 276, 277, 278, 279, 280, 33/285, 286, 287, 289, 293, 299, DIG. 21; 356/153, 154, 615, 620, 622; 473/470
See application file for complete search history.

(56) References Cited

U.S. PATENT DOCUMENTS

| | | | | |
|---|---|---|---|---|
| 2,755,555 A | * | 7/1956 | Spaeder ..................... 33/293 |
| 3,588,255 A | * | 6/1971 | Alexander ............... 356/152.1 |
| 3,936,197 A | * | 2/1976 | Aldrink et al. ............. 356/250 |
| 4,090,708 A | | 5/1978 | McPeak |
| 4,492,471 A | * | 1/1985 | Wiklund .................... 356/622 |
| 4,681,439 A | * | 7/1987 | Shoemaker ................ 356/154 |
| 4,908,948 A | * | 3/1990 | Gormley ..................... 33/276 |
| 5,118,184 A | * | 6/1992 | Kordana .................... 356/140 |
| 5,218,770 A | * | 6/1993 | Toga .......................... 33/276 |
| 5,243,398 A | * | 9/1993 | Nielsen .................... 356/138 |
| 5,402,226 A | * | 3/1995 | Matthews et al. ........ 356/141.3 |
| 5,524,352 A | * | 6/1996 | Rando et al. ................ 33/291 |
| 5,748,306 A | * | 5/1998 | Louis ....................... 356/247 |
| 5,767,952 A | * | 6/1998 | Ohtomo et al. ............ 356/4.01 |
| 5,864,956 A | * | 2/1999 | Dong ......................... 33/227 |
| 6,002,473 A | * | 12/1999 | West ........................ 356/153 |
| 6,133,998 A | * | 10/2000 | Monz et al. .............. 356/141.4 |

(Continued)

FOREIGN PATENT DOCUMENTS

DE    4013950 A1    11/1991

(Continued)

Primary Examiner—R. A. Smith
(74) Attorney, Agent, or Firm—Workman Nydegger (57) ABSTRACT

A reference beam generator (1) for guiding a field marker for ground markings has a support element (11) which can be positioned in a defined manner relative to the Earth's surface, a laser diode and beam guidance means for the emission of the radiation (LS) to at least one reference target (4), the radiation (LS) being emitted with an asymmetrical beam cross-section (5), in particular in the form of a fan, and the beam guidance means being adjustable in a defined manner relative to the support element (11). The radiation (LS) can be aligned with the reference target (4) by an optical detection component for detecting and providing the radiation reflected by the reference target, in particular a telescope (12).

23 Claims, 6 Drawing Sheets

U.S. PATENT DOCUMENTS

| | | | |
|---|---|---|---|
| 6,202,312 B1 * | 3/2001 | Rando | 33/227 |
| 6,694,629 B2 * | 2/2004 | Goodrich | 33/286 |
| 6,734,952 B2 * | 5/2004 | Benz et al. | 356/5.01 |
| 7,310,887 B2 * | 12/2007 | Nash et al. | 33/286 |

FOREIGN PATENT DOCUMENTS

| | | |
|---|---|---|
| EP | 1061335 A2 | 12/2000 |
| WO | WO2006/013386 A2 | 2/2006 |

* cited by examiner

REFERENCE BEAM GENERATOR AND SYSTEM FOR PRODUCING GUIDE BEAMS FOR FIELD MARKERS

The invention relates to a reference beam generator for guiding a field marker for producing ground marks and a system for producing guide beams for a field marker.

For the marking of sports fields, it is usual today to measure out the sports field accurately, to lay it out and to run over it with a field marker and to mark it. The field marker has an outlet for a marking substance. Markings carried out in this manner are extremely time-consuming and also expensive if they are carried out by one or more workpeople. The workpeople must first measure and layout the entire—generally very large—sports field and then run over the field with the field marker. The positional accuracy of the marking depends on the guidance of the field marker by the workperson. In addition, there are often deviations from the desired marking positions in this type of marking work.

An improvement in the marking work with respect to accuracy, time requirement and ease of handling is provided by the use of optical guide beams which are produced by a basic system and by means of which a field marker can be guided.

The application of playing field marks using such systems if of course dependent on the handling properties and accuracy of the guide beam. The positioning and position thereof in space may be related to various reference parameters. Generally, a corner of the sports field is chosen as a point of reference of the sports field to be marked. Depending on the type of sport, local conditions and further circumstances, such as, for example, standard requirements, the marks are then defined with reference to other parameters. These may be, for example, already marked corners of a sports field, posts of goals or already present ground lines. Depending on conditions, small deviations from ideal dimensions, for example due to acute-angled playing fields, may occur here.

In order to define an appropriately adapted marking, the emitted beam is generally aligned relative to a reference target positioned at a reference point.

Such a system is disclosed, for example, in DE 40 13 950. An apparatus for marking ground areas, in particular floors in exhibition halls, is described. The apparatus controls a vehicle having its own drive automatically along a guide line of a laser beam, a marking device applying marks to the ground area according to a predeterminable marking program as a function of the distance covered. The apparatus is intended in particular for marking exhibition halls. A beam which serves for fixing a straight line, for example a side of a field to be marked, is produced by a laser diode and an optical system. The field marker used for applying the marking substance has a detector for the laser radiation, the position of the field marker being determined relative to the beam so that the field marker can be automatically controlled on the basis of the laser beam.

Here, the laser diode is arranged on a laboratory carriage which in turn is fastened on a baseplate with guide strips for fixing with respect to a defined position. For carrying out the marking work, the optical guide beam must be exactly aligned with the aid of an adjusting plate, the permissible height of incidence of the laser beam being limited since the field marker should remain in a region of signal reception during the movement.

The system is therefore limited only to comparatively short distances and a flat surface, as occurs, for example, within halls. Adjustment of the beam over larger distances remains problematic since the laser spot has to be aligned in two dimensions. In addition, unevenness of the floor, as occurs particularly in the case of sports fields having a natural surface, rapidly results in the receiver of the field marker losing the beam.

It is an object of the invention to provide a system or system components which permits or permit simpler, more robust and more accurate fixing of laser beams for field markers or the guidance thereof.

A further object of the invention is to provide such a system or system components having a large range, i.e. also for large playing fields to be marked.

These objects are achieved, according to the invention, by the subjects of claims 1 and 13 or of the dependent claims, or the solutions are further developed.

The invention provides a solution which permits faster, simplified and more accurate marking of—in particular—sports fields by replacing the manual laying out of a field by "laying out" by means of a laser transmitting unit by virtue of the fact that the transmitting unit defines a plane relative to which a marking device can orient itself.

For this purpose, it is intended to position the laser transmitting unit at a suitable starting position for a sports field—for example in the corner of a football field. A laser fan beam is sent out by the transmitting unit in at least one direction, but preferably two fan beams at right angles to one another are sent out. These laser fans define planes perpendicular to the field to be marked and as a reference ("layout") for lines to be marked. The sports field is—partly—defined, so to speak optically—partly—laid out, by the fan planes defined in this manner.

The laser transmitting unit comprises a laser and a beam diverger for producing a laser fan, preferably also a further optical component—for example a pentaprism—for splitting the laser fan into two partial fans, and is formed in such a way that it can be fixed at a defined position, for example by means of a stand or a support plate. In general, a laser emitting a fan beam is mounted on a right-angled plate having two limbs, in such a way that it emits the laser beam at a defined distance to a line to be marked, corresponding to the structural circumstances of the field marker used. The detector of the field marker is preferably in the form of a linear or two-dimensional array of photodiodes, which array is advantageously arranged on the control unit transversely to the laser light plane defined by the laser transmitting unit of the reference beam generator.

By means of the photosensitive detector, the laser signals of the laser transmitting unit are detected or the "actual" position of the detector or of the field marker relative to the laser plane is determined. If the detector determines that the actual position deviates from a reference position, (i.e. for example that the detector receives no signal or a signal at the incorrect point), this information is appropriately processed. For example, a display unit which displays the position of the detector or of the field marker relative to the laser plane, for example by means of different indicator lamps can be mounted on the field marker. In particular, however, if deviation from the plane defined by the laser fan is found, a control instruction is transmitted to the application unit or the application unit appropriately controls the deviation found. This control can be effected in various ways, for example also completely automatically.

Advantageously, the reference beam generator is formed with its baseplate—or another support element as a retaining or positioning element—in such a way that it can be carried by a workperson.

In the production of ground markings according to the invention—for example for a sports field, a pattern, a script, etc.—the following procedure is therefore adopted: A laser transmitting unit is positioned—for example at a corner of the field. For the determination of the laser beam in three dimensions for the field marker, the emitted radiation is directed at a reference target and adjusted relative to the reference target so that a defined alignment, i.e. position and orientation, is achieved on the reference target. If elements of the field to be processed or other reference points, such as, for example, goal posts on a football field, are already present, an alignment with these objects can be effected by means of the positioning of the reference target. The transmitting unit emits a laser beam, preferably a beam which is divergent in the manner of a fan and which defines a plane, this plane being fixed on the basis of the reflection at the reference target.

The asymmetrical, in particular elliptical or strip-like, beam cross-section and a corresponding misshaped reflective region of the reference target are caused to coincide. According to the invention, the reflection at the reference target can be viewed through an optical component, such as, for example, a telescope. By means of adjusting elements, the alignment of the emission is adjusted until beam cross-section and reflective region of the reference target have been brought into coincidence. By means of the tailored design of the reflective region, the maximum intensity of the reflection is achieved even on achieving coincidence, so that good visual detectability follows and automatability is also possible. The adjustment of the emission direction can be effected in a plurality of stages. The entire reference beam generator can first be coarsely adjusted, for example levelled relative to the Earth's surface by means of its support element. However, a non vertical orientation relative to the ground marking plane or the Earth's surface or a non-levelled emission, for example in the case of ascending, descending or undulating terrain, can also be chosen as emission alignment of the radiation emitted by the laser transmitting unit or of the laser fan. A finer adjustment can then be effected by means of precision mechanical drives or electrical or optical components. The adjustment process can also be supported by mean of motors or automated.

Troublesome background radiation can be suppressed by the use of filters which are transparent only to the emitted spectral range.

Owing to the geometrical conditions of most sports fields, simultaneous production and fixing of two or more beams or part-beams is advantageous since two laser beams can be used in this way without relocating the reference beam generator. According to the invention, this can be effected by a plurality of beam sources or beam splitting, and the splitting can be effected, for example, in transmission or reflection. In an embodiment according to the invention, a common beam source and, for the subsequent splitting, a pentaprism are used. As a result, two outer lines can be defined for most right-angled playing fields. In reality, however, deviations from this geometry may occur if, for example, the playing field has to be fixed with reference to the goal posts and the goals are not oriented exactly parallel. In order to be able to mark such acute-angled playing fields too, the emission angle of the two or more part-beams can be designed so as to be adjustable, for example by a displaceable adjusting wedge.

A marking vehicle which is pushed, for example, by a workperson can be oriented relative to the guide beam established by reference beam generator and reference target or the plurality of guide beams. The orientation of the device relative to the laser beam is effected by detection of the guide beam on a detector of the device, preferably a photodiode, linear or two-dimensional array. If the detector receives an incorrect signal, it can, for example, communicate the information "too far left" or "too far right", for example by illuminating alarm lamps. Furthermore, the position of the outlet of the marking vehicle can be corrected until the detector once again receives the "correct" signal.

A reference beam generator according to the invention and a system according to the invention are described in more detail below, purely by way of example, with reference to working examples shown schematically in the drawing. Specifically.

Figure 1:
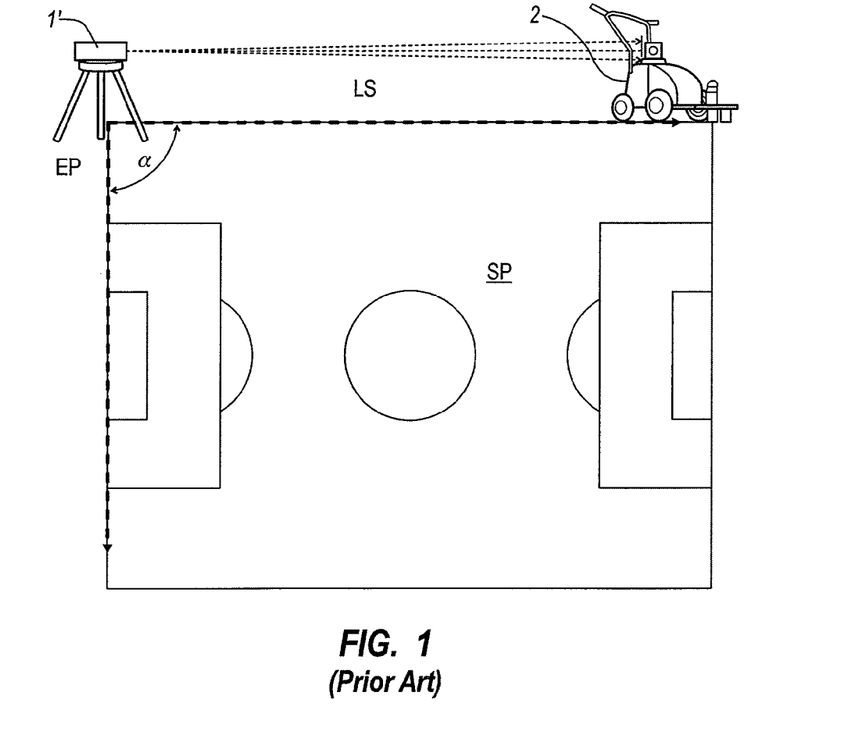
FIG. 1 shows a schematic explanation of methods for marking sports fields.

FIG. 1 explains an exemplary method for marking sports fields according to the prior art with a control of a field marker 2 using a reference beam generator 1'. The situation in which a playing field SP is to be provided with markings of the generic type is shown. The specification of the line to be marked is provided by means of a reference beam generator 1' which is to be operated by an operator and is positioned remotely on a corner point EP. The field marker 2 is guided by means of the emission of the reference beam generator 1' as guide beam LS and optical link. For marking a processing line which fixes one side of the playing field SP, the field marker 2 with its receiver must be guided to a line along which the guide beam can be received. In this example, this is not coincident with the processing line since, owing to the spatial distance between processing elements and the receiver axis, an offset is required in order to apply the marking correctly. The electronics of the field marker 2 controls this or indicates corresponding corrections for the user so that the deviation between guide beam LS and receiver axis is kept within a predetermined deviation. By fixing the guide beam LS, the field marker 2 can thus be guided with the receiver axis on a reference line so that application of the marking is possible.

If it is intended to mark a plurality of lines laid at an angle α to one another, it is necessary in methods of the prior art to realign the emission of the reference beam generator 1' in order to provide a further guide beam. By successive realignment of guide beams LS the entire playing field SP can finally be marked.

Figure 2A:
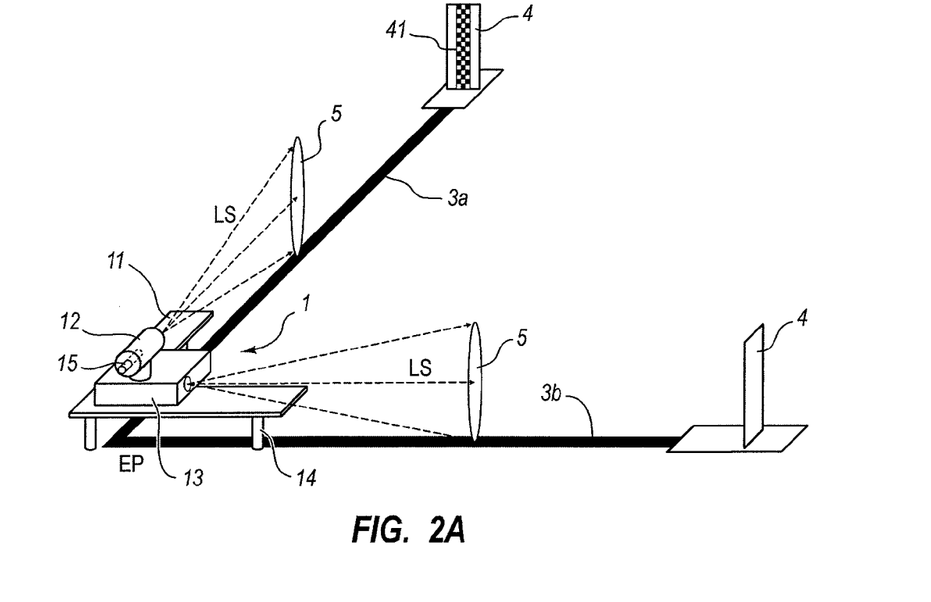
FIGS. 2A-2C show schematic diagrams of the system according to the invention.
Figure 2B:
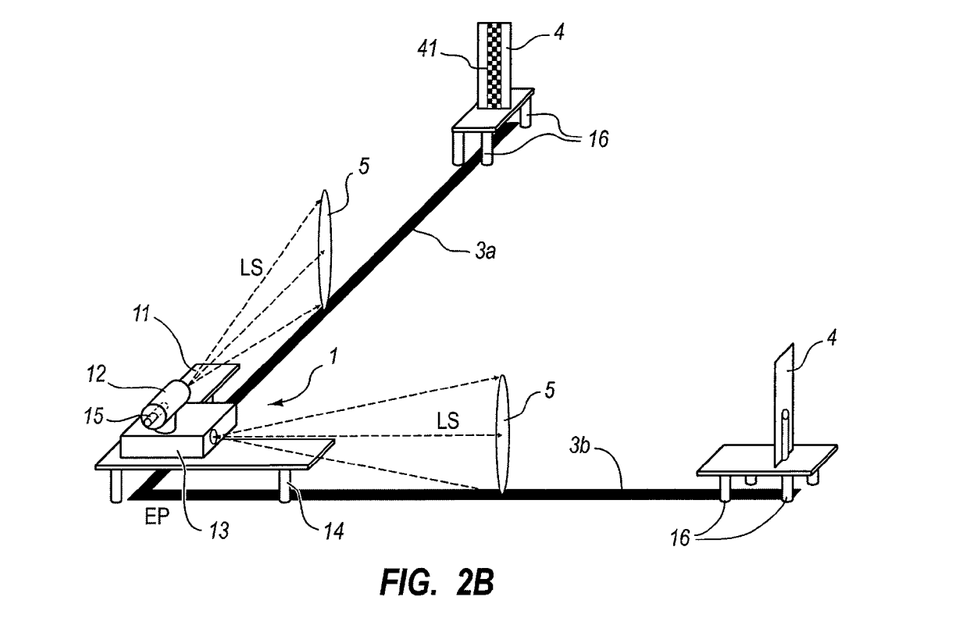
Figure 2C:
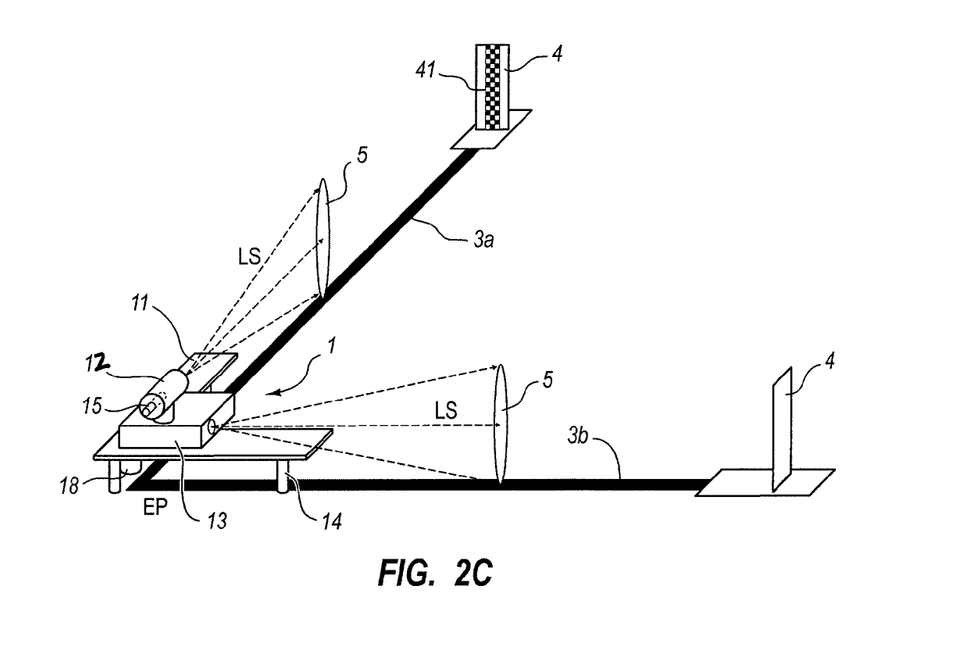

FIGS. 2A-2C show schematic diagrams of the system according to the invention with the cooperation of its components. Two guide beams LS are emitted at a predefined angle, for example of 90°, in the direction of two reference targets 4 by a reference beam generator 1 according to the invention. The reference beam generator 1 has an L-shaped base plate 11 with two limbs oriented at right angles to one another as a support element. The components of the reference beam generator 1 are adjustably mounted on this base plate 11 which can be fixed relative to the Earth's surface, it being possible for the base plate 11 itself to be adjusted relative to the Earth's surface by leg-like positioning elements 14 for the coarse adjustment of the support element. In this example, the base plate 11 is positioned relative to a corner point EP and a fine adjustment is then carried out by adjusting the components. A source of electromagnetic radiation, for example a laser diode, having beam guidance means 13 for producing a fan-like emission of the radiation and for definition of an emission direction and orientation of the beam cross-section is adjustably arranged on the base plate 11, it being possible for the emission direction and orientation or alignment in space to be adjusted and fixed in a defined manner.

The radiation emitted as guide beam LS has an asymmetrical beam cross-section 5, which is shown here as elliptical by way of example. The beam cross-section 5 may already be provided by a corresponding cross-section of the emission of the source or may be shaped after production. Here, it is possible to use static methods, such as, for example, by means of a cylindrical lens as a beam diverger or dynamic or time-dependant approaches, such as, for example, by a movement of the source or of the emission thereof. Thus, the scanning or emission in a linear strip-like region can be effected, for example, by means of a scanner wheel, so that, viewed over time, a fan-like emission is produced. By means of such emission of the two guide beams LS one or more field markers can be guided for producing two lines 3a and 3b of the playing field, the generated fans of the guide beams LS providing the planes for the orientation and alignment of the field markers.

The reflective region 41 of the reference targets 4 corresponds in its shape or the cross-section to the beam cross-section 5 so that, in the case of correspondence of beam cross-section 5 and reflective region 41, the intensity maximum of the reflection indicates the correct alignment. The shape of the reflective region 41 can be produced by the shape of the reflective material itself, for example of a strip of a reflective foil, or by a correspondingly shaped cover of the reflective material, for example by a mask having a slot. The reference target 4 can likewise be formed with a reference support element in an manner similar to the reference beam generator 1 or the base plate 11 thereof, for example with two limbs in an L-shape and adjustable legs 16 (see FIG. 2B), so that appropriate possibilities of adjustment also exist for the reference target 4.

The reflected radiation is detected by an optical detection component for the detection and provision of the radiation reflected by the reference target 4, which detection component is formed here as telescope 12 for the use of the human eye. The optical detection component can have an optical filter 15 transparent only to the emitted optical radiation. Alternatively or in addition, the optical detection component can also be in the form of an electrooptical detector, for example in the form of a CCD or CMOS camera, so that automatic alignment processes, for example with the driving by motors 18 (see FIG. 2C), are also possible. At an appropriate intensity of the source or short distances, it is also possible to dispense with the optical detection component or an alignment can be effected even without the use thereof.

Figure 3:
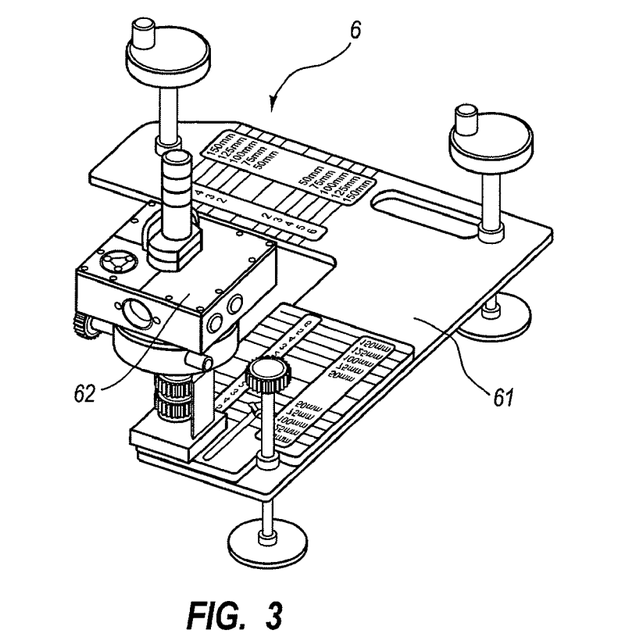
FIG. 3 shows the representational diagram of a working example for a reference beam generator according to the invention.

FIG. 3 shows the representational diagram of a working example for a reference beam generator 6 according to the invention, having an L-shaped base plate 61 as the support element and a pivotable and displaceable beam unit 62 with source and beam guidance means. An explanatory representational diagram of the components of this reference beam generator 6 is shown in FIG. 4-7.

Figure 4:
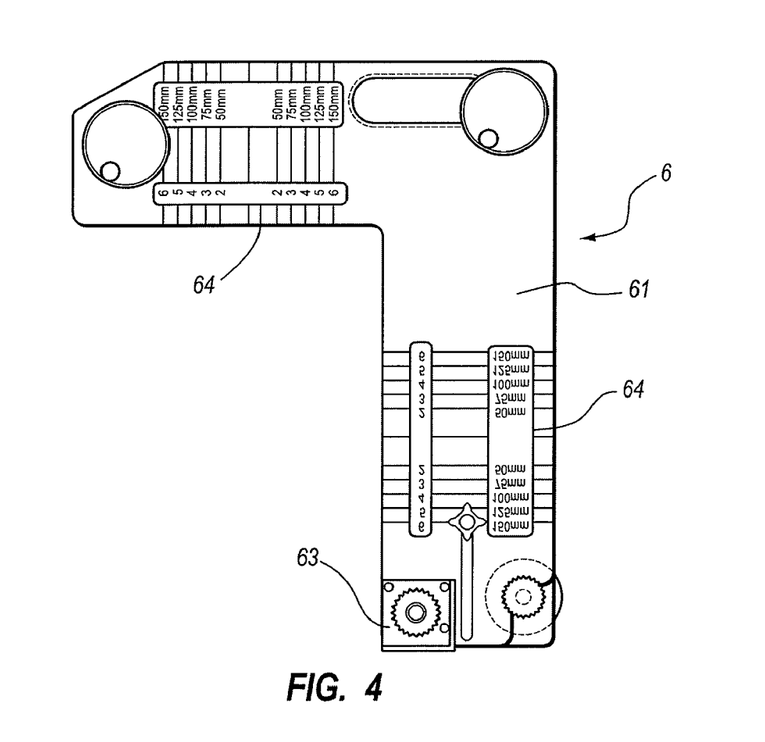
FIG. 4-7 shows the representational diagram of components of the working example for a reference beam generator according to the invention and FIGS. 8A-B show schematic diagrams of the beam splitting by a pentaprism for the working example.

FIG. 4 shows the base plate in plan view. A displaceable receptacle 63 for the beam unit is arranged on the base plate, this receptacle 63 additionally permitting a rotation of the beam unit. A first adjustment of the beam unit relative to the Earth's surface can be effected by displacing the receptacle 63 on the base plate, a quantification of the movement or position being effected by means of a graduation 64 on each of the two limbs.

Figure 5:
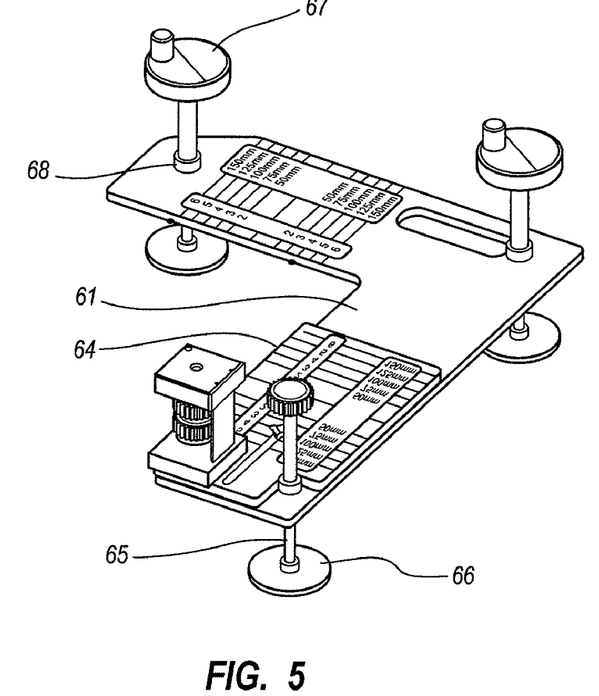

The base plate 61 itself is positioned and fixed beforehand relative to a distinguished point on the Earth's surface. Corresponding adjustability in height and inclination is provided by three height-adjustable feet or leg-like components 65. These have disc-like plates 66 on their underside and, at least in the case of two of the leg-like components 65, an adjusting drive 67 on the top. The leg-like components 65 are connected to the base plate 61 by passages and bushes 68.

Figure 6:
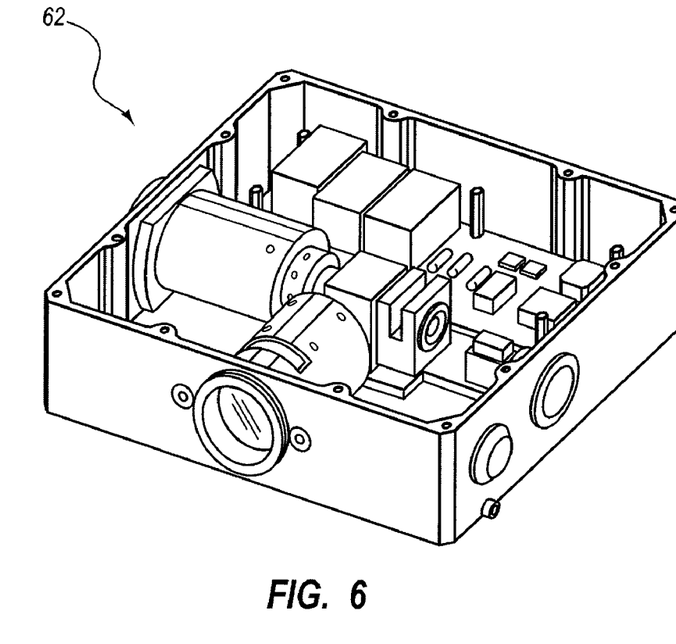
Figure 7:
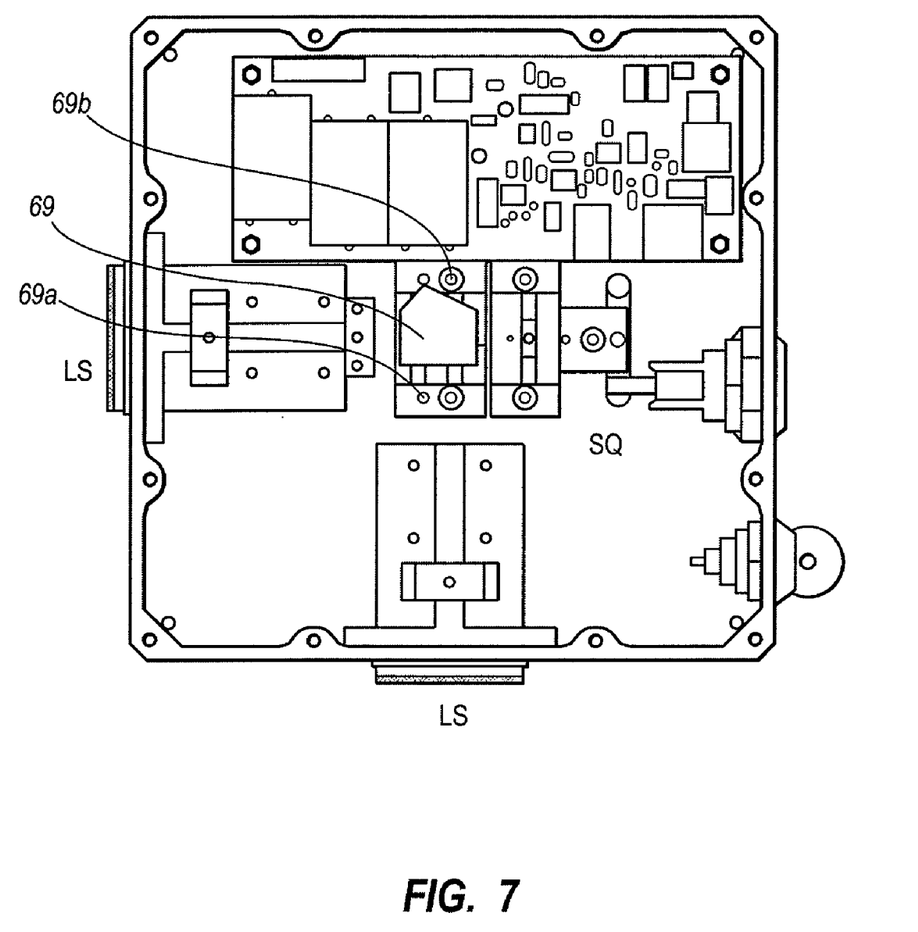

FIG. 6 shows a view of the opened beam unit 62 with the components of source and beam guidance means, which are explained in more detail in FIG. 7 in plan view. For beam splitting, a pentaprism 69 which is fixed in the beam unit by means of a holder 69a and screw 69b is used in this example. Electromagnetic radiation, for example laser light, is generated by the beam source SQ arranged on the right side and is input into the pentaprism 69. There, splitting and subsequently, via coordinated optical systems, emission as laser beams LS take place. The angle of the two guide beams relative to one another can be varied continuously or in discrete steps, for example, by optical components, for example by adjustable mirrors or optical wedges.

Figure 8A:
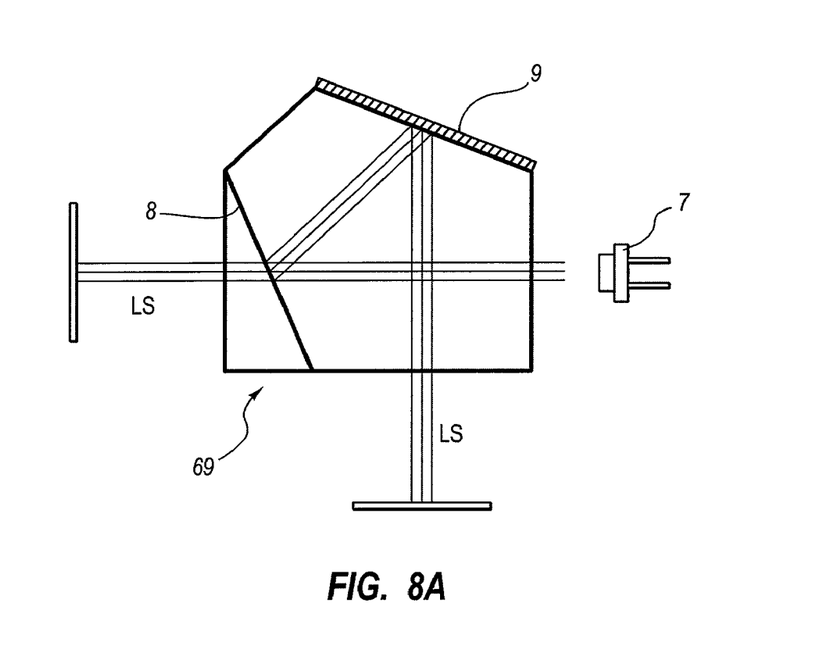
Figure 8B:
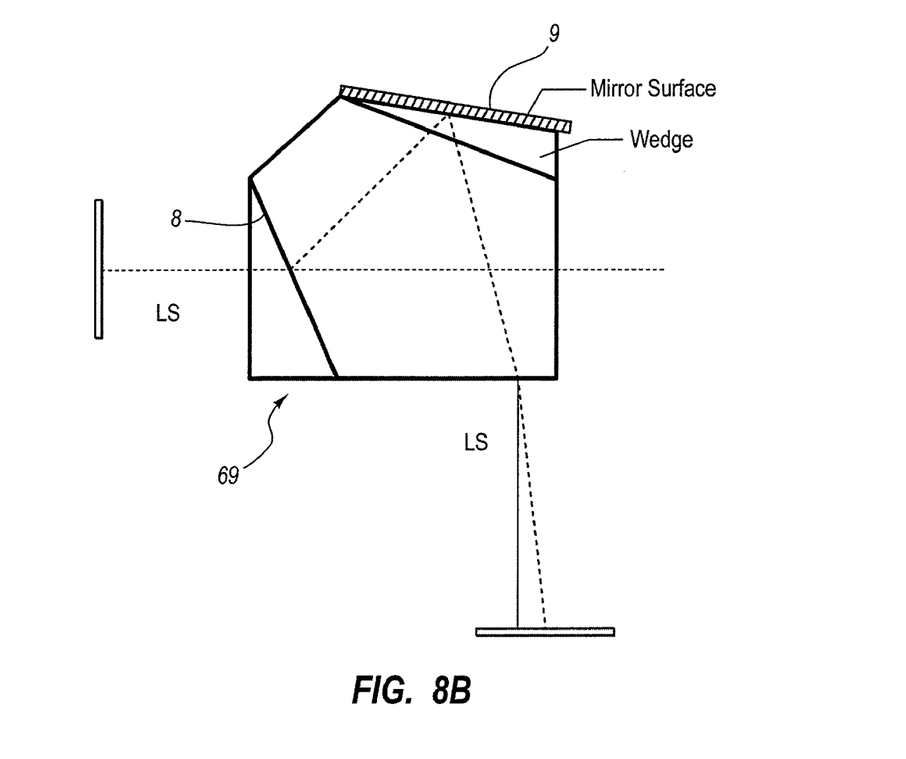

Here, FIGS. 8A and 8B explain the beam splitting by the pentaprism 69 schematically. The radiation of the laser diode 7 as the laser source enters the pentaprism 69 from the right side and is incident on a semi transparent surface 8 so that beam splitting in the ratio 50/50 takes place and a part is output as a first guide beam. The reflected portion is incident on a mirror surface 9, for example on a silver mirror, and is finally emitted through an exit surface as a second guide beam. In addition, all optical transmitting surfaces can be formed so as to be reflection-reducing or transmission-increasing, for example by means of coatings. The angle setting between two guide beams can be effected, for example, by means of a wedge (see FIG. 8B) between pentaprism 69 and mirror surface 9, with the result that the second guide beam is changed in its direction. Alternatively or in addition, however, adjustable mirror surfaces or similar optical components can also be used for changing the emission direction.

The invention claimed is:

1. Reference beam generator, for guiding a field marker movable relative to the reference beam generator and intended for producing ground markings, comprising:
    a positionable and fixable support element defined relative to the Earth's surface, the support element having a geometry with two limbs arranged at right angles;
    a source of electromagnetic radiation;
    beam guidance means for emitting a first and second fan-like emission of the radiation and for defining a first emission direction and orientation of the beam cross-section, the beam guidance means being configured to adjust and fix the first emission direction and orientation for achieving a defined alignment to at least one reference target, and the beam guidance means defining a second emission direction with a predefined angle relative to the first emission direction or being configured to adjust and fix the second emission direction and orientation for achieving a defined alignment to a second reference target, wherein components of the beam guidance means are arranged so as to be longitudinally displaceable relative to the limbs; and
    an optical detection component for detecting the radiation reflected by the at least one reference target and displaying said radiation in a manner visible to the human eye.

2. Reference beam generator according to claim 1, the source of electromagnetic radiation including a laser diode.

3. Reference beam generator according to claim 1, wherein the optical detection component includes a telescope.

4. Reference beam generator according to claim 1, wherein the orientation of the beam cross-section is adjustable vertically relative to the Earth's surface.

5. Reference beam generator according to claim 1, wherein the optical detection component includes an optical filter transparent only to the emitted optical radiation.

6. Reference beam generator according to claim 1, wherein the beam guidance means includes a beam splitter for producing at least two part-beams.

7. Reference beam generator according to claim 6, wherein the beam splitter includes a pentaprism.

8. Reference beam generator according to claim 6, wherein the beam splitter has an adjustable emission angle of the at least two part-beams.

9. Reference beam generator according to claim 8, wherein the emission angle is adjustable by means of an optical wedge.

10. Reference beam generator according to claim 1, further comprising:
    a precision drive for adjusting the alignment of the emission.

11. Reference beam generator according to claim 10, wherein the precision drive includes an electrooptical detection component and a motor for automated adjustment.

12. Reference beam generator according to claim 1, further comprising at least one positioning element for coarse adjustment of the support element relative to the Earth's surface.

13. Reference beam generator according to claim 1, further comprising three positioning elements for coarse adjustment of the support element relative to the Earth's surface.

14. Reference beam generator according to claim 1, wherein the two limbs are arranged in an L-shaped geometry.

15. Reference beam generator according to claim 1, further comprising a beam unit including the source of electromagnetic radiation, wherein the beam unit is pivotable relative to the support element.

16. Reference beam generator according to claim 1, further comprising three height-adjustable elements connected to the support element for height adjustment of the support element.

17. System for producing guide beams for field markers, comprising:
    a reference beam generator according to claim 1; and
    at least one reference target, the reference target having a reflective region with an asymmetrical cross-section.

18. System according to claim 17, the reflective region having a strip-like cross-section.

19. System according to claim 17, wherein the reflective region is in the form of a linear reflector or in the form of a mask having a slot before a reflector.

20. System according to claim 17, wherein the reference target has a reference support element which can be positioned, the reflective region being formed so as to be adjustable relative to the reference support element.

21. System according to claim 20, wherein the reference support element is configured to be anchored and leveled in a defined manner relative to the Earth's surface.

22. System for marking a field, comprising:
    the reference beam generator according to claim 1; and
    a marking vehicle configured to be guided by the fan-like emissions of radiation.

23. System according to clam 22, wherein the marking vehicle includes a receiver for receiving the emitted radiation, wherein the marking vehicle further includes electronics configured to indicate corrections for a user so that a deviation from the emitted radiation is kept within a predetermined deviation.

* * * * *